United States Patent
Byun et al.

(10) Patent No.: US 8,920,962 B2
(45) Date of Patent: Dec. 30, 2014

(54) SECONDARY BATTERY

(75) Inventors: Sangwon Byun, Yongin-si (KR);
Jeongwon Oh, Yongin-si (KR)

(73) Assignees: Samsung SDI Co., Ltd., Yongin-si
(KR); Robert Bosch GmbH, Stuttgart
(DE)

( * ) Notice: Subject to any disclaimer, the term of this patent is extended or adjusted under 35 U.S.C. 154(b) by 400 days.

(21) Appl. No.: 13/189,322

(22) Filed: Jul. 22, 2011

(65) Prior Publication Data

US 2012/0183818 A1 Jul. 19, 2012

(30) Foreign Application Priority Data

Jan. 13, 2011 (KR) .......................... 10-2011-0003539

(51) Int. Cl.
*H01M 2/26* (2006.01)
*H01M 2/12* (2006.01)

(52) U.S. Cl.
USPC ............. 429/161; 429/163; 429/164; 429/53; 429/54; 429/82

(58) Field of Classification Search
None
See application file for complete search history.

(56) References Cited

U.S. PATENT DOCUMENTS

| 4,521,500 A * | 6/1985 | Watanabe ..................... 429/185 |
| 5,609,972 A * | 3/1997 | Kaschmitter et al. ........... 429/56 |
| 2002/0136944 A1 * | 9/2002 | Nemoto et al. ............... 429/120 |
| 2005/0266279 A1 | 12/2005 | Kim |
| 2006/0240320 A1 * | 10/2006 | Cheon et al. .................. 429/175 |
| 2007/0202397 A1 | 8/2007 | Cho |
| 2010/0279156 A1 | 11/2010 | Kim et al. |

FOREIGN PATENT DOCUMENTS

| KR | 10-0561308 | 3/2006 |
| KR | 2007-0088893 A | 8/2007 |
| WO | WO 00/72388 A1 | 11/2000 |

OTHER PUBLICATIONS

KIPO Notice of Allowance dated Dec. 20, 2012 in KR No. 10-2011-0003539, 5 pages.
Korean Office action dated Jun. 14, 2012 issued to Korean priority patent application No. 10-2011-0003539, 4 pages.

* cited by examiner

*Primary Examiner* — Cynthia K. Walls
(74) *Attorney, Agent, or Firm* — Christie, Parker & Hale, LLP

(57) ABSTRACT

A secondary battery includes an electrode assembly comprising a first electrode plate, a second electrode plate, and a separator located between the first electrode plate and the second electrode plate; a case accommodating the electrode assembly; and a cap assembly coupled to the case, wherein the cap assembly comprises a cap plate sealing the case and having a short-circuit hole, an inversion plate in the short-circuit hole of the cap plate, a connection plate covering the short-circuit hole of the cap plate, and an insulation layer on the inversion plate or the connection plate.

13 Claims, 5 Drawing Sheets

SECONDARY BATTERY

CROSS-REFERENCE TO RELATED APPLICATION

This application claims priority to and the benefit of Korean Patent Application No. 10-2011-0003539, filed on Jan. 13, 2011, the entire content of which is incorporated herein by reference.

BACKGROUND

1. Field

Aspects of the present invention relate to a secondary battery.

2. Description of the Related Art

A secondary battery may be charged and discharged unlike a primary battery that cannot be recharged. A low capacity secondary battery that comprises a pack shaped battery cell may be used as a power source for various small portable electronic devices such as cellular phones, laptop computers, and camcorders. A high capacity secondary battery that has several tens of the battery cells that are connected may be used as power sources for driving motors such as a hybrid automobile.

The secondary battery may be fabricated into various shapes including a cylindrical and a rectangular box shape and may comprise an electrode assembly comprising a positive electrode and a negative electrode and an insulating separator that is located between the electrodes and is wound and inserted into a case. The case is mounted with a cap assembly that is formed with an outer terminal to provide a battery. A positive terminal and a negative terminal are connected to the electrode assembly and protrude to the outside through the cap plate.

SUMMARY

Embodiments of the present invention provide a secondary battery which can prevent corrosion by forming an insulation layer on a connection plate and an inversion plate.

According to one embodiment of the present invention, a secondary battery includes an electrode assembly comprising a first electrode plate, a second electrode plate, and a separator located between the first electrode plate and the second electrode plate; a case accommodating the electrode assembly; and a cap assembly coupled to the case, wherein the cap assembly comprises a cap plate sealing the case and having a short-circuit hole, an inversion plate in the short-circuit hole of the cap plate, a connection plate covering the short-circuit hole of the cap plate, and an insulation layer on the inversion plate or the connection plate.

In one embodiment, the insulation layer is on at least one surface of the connection plate facing towards or away from the electrode assembly. Further, the inversion plate may include a convex round portion protruding towards the electrode assembly and an edge portion fixed to the cap plate, wherein the round portion is configured to be protrude away from the electrode assembly if the pressure within the secondary battery reaches a preset pressure. In one embodiment, the insulation layer is at least one of the edge portion of the inversion plate or one surface of the connection plate facing towards or away from the electrode assembly and on the edge portion of the inversion plate. Additionally, the insulation layer may include any one selected from an oxide film, polypropylene (PP), polyethylene (PE), polyvinyl chloride (PVC), urethane, nylon, and Teflon.

In one embodiment, the connection plate has a protrusion part that is configured to contact the inversion plate. The protrusion part may protrude toward the inversion plate, may have a diameter smaller than a diameter of the inversion plate and may be exposed through the insulation layer.

In one embodiment, the secondary battery includes a first electrode terminal penetrating a first side of the cap plate and electrically coupled to the first electrode plate, wherein the first electrode terminal includes a first collector plate electrically coupled to the first electrode plate, and a first terminal pillar electrically connected to the first collector plate and penetrating the cap plate and the connection plate.

As described above, in the secondary battery according to the present invention, an insulation layer is formed on a connection plate, thereby preventing the connecting late from corroding due to externally induced moisture.

In addition, in the secondary battery according to the present invention, an insulation layer is formed on an inversion plate, thereby preventing the connecting plate from corroding due to externally induced moisture.

Further, in the secondary battery according to the present invention, an insulation layer is formed on both a connection plate and an inversion plate, thereby preventing the connecting late from corroding due to externally induced moisture.

Additional aspects and/or advantages of the invention will be set forth in part in the description which follows.

BRIEF DESCRIPTION OF THE DRAWINGS

The objects, features and advantages of the present invention will be more apparent from the following detailed description in conjunction with the accompanying drawings, in which.

DETAILED DESCRIPTION

Hereinafter, embodiments of embodiments of the invention will be described in detail with reference to the accompanying drawings such that they can easily be made and used by those skilled in the art.

Figure 1:
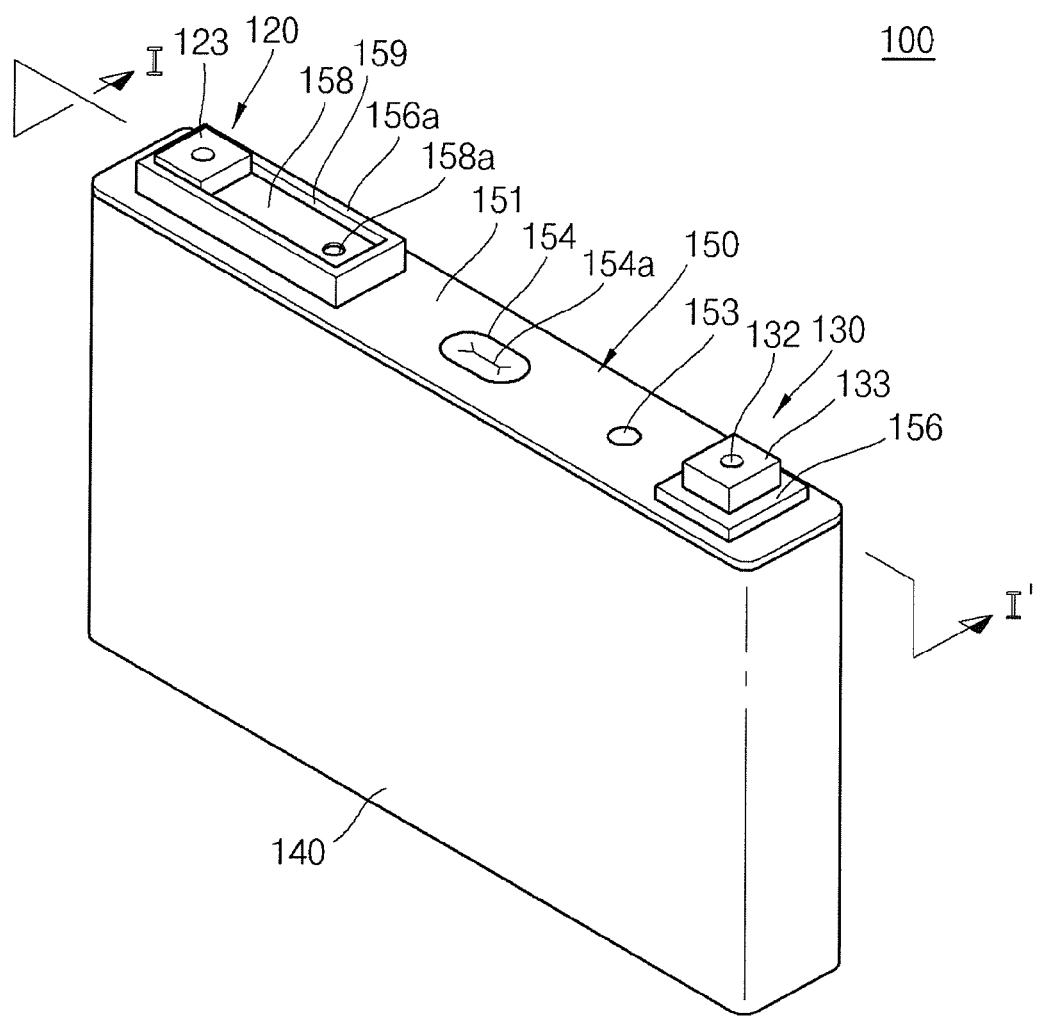
FIG. 1 is a perspective view of a secondary battery according to an embodiment of the present invention.
Figure 2:
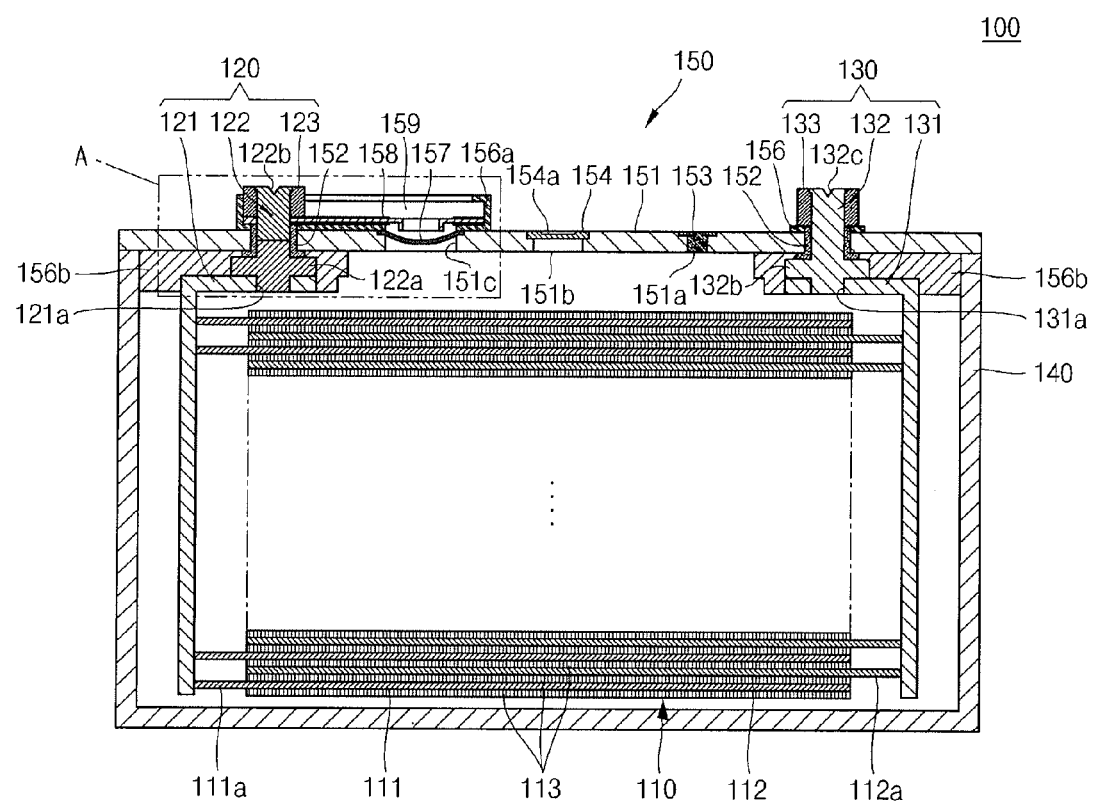
FIG. 2 is a cross-sectional view of the secondary battery taken along the line shown in FIG. 1.
Figure 3:
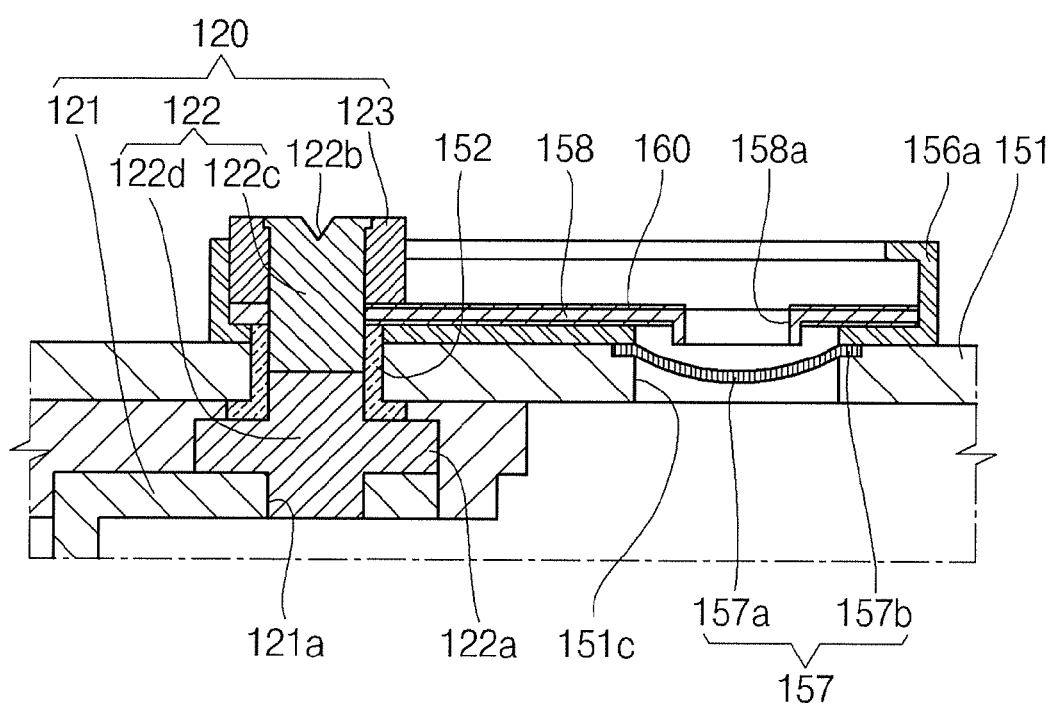
FIG. 3 is an enlarged cross-sectional view of a portion 'A' of FIG. 2.

FIG. 1 is a perspective view of a secondary battery according to an embodiment of the present invention, FIG. 2 is a cross-sectional view of the secondary battery taken along the line shown in FIG. 1, and FIG. 3 is an enlarged cross-sectional view of a portion 'A' of FIG. 2.

Referring to FIGS. 1 to 3, the secondary battery 100 according to the illustrated embodiment includes an electrode assembly 110, a first electrode terminal 120, a second electrode terminal 130, a case 140, a cap assembly 150 and an insulation layer 160.

The electrode assembly 110 is formed by winding or stacking a stacked structure of a first electrode plate 111, a separator 113 and a second electrode plate 112, which are thin film- or layer-shaped. Here, the first electrode plate 111 may serve as a negative electrode and the second electrode plate 112 may serve as a positive electrode.

The first electrode plate 111 is formed by coating a first electrode active material such as graphite or carbon on a first electrode current collector formed of a metal foil made of nickel or copper, and includes a first electrode uncoated portion 111a that has no first electrode active material coated thereon. The first electrode uncoated portion 111a becomes a path of the flow of current between the first electrode plate 111 and the outside of the first electrode plate 111. However, aspects of the present invention are not limited to the materials of the first electrode plate 111 disclosed herein.

The second electrode plate 112 is formed by coating a second electrode active material such as a transition metal oxide on a second electrode current collector formed of a metal foil made of aluminum, and includes a second electrode uncoated portion 112a that has no second electrode active material coated thereon.

The second electrode uncoated portion 112a becomes a path of the flow of current between the second electrode plate 112 and the outside of the second electrode plate 112. However, aspects of the present invention are not limited to the materials of the second electrode plate 112 disclosed herein.

The polarities of the first electrode plate 111 and the second electrode plate 112 may be reversed with respect to each other.

The separator 113 is positioned between the first electrode plate 111 and the second electrode plate 112 to prevent an electric short circuit therebetween and to allow lithium ions to move. The separator 113 may be made of polyethylene, polypropylene or a composite film thereof. However, aspects of the present invention are not limited to the materials of the separator 113 disclosed herein.

A first electrode terminal 120 and a second electrode terminal 130 are coupled to both ends of the electrode assembly 110 to be electrically connected with the first electrode plate 111 and the second electrode plate 112, respectively.

The electrode assembly 110 is substantially housed in the case 140 together with an electrolyte. The electrolyte may include an organic solvent such as ethylene carbonate (EC), propylene carbonate (PC), diethyl carbonate (DEC), ethyl methyl carbonate (EMC), or dimethyl carbonate (DMC), and a lithium salt such as $LiPF_6$, or $LiBF_4$. In addition, the electrolyte may be in a liquid, solid or gel phase.

The first electrode terminal 120 is made of a conductive material such as copper and is electrically connected to the first electrode plate 111. The first electrode terminal 120 includes a first collector plate 121, a first terminal pillar 122 and a first terminal nut 123.

The first collector plate 121 contacts the first electrode uncoated portion 111a protruding toward one end of the electrode assembly 110. The first collector plate 121 is formed in an inverted L-shaped ('¬'-shaped) configuration and has a first terminal hole 121a formed at its top portion. The first terminal pillar 122 is fitted into and coupled to the first terminal hole 121a.

The first terminal pillar 122 penetrates the cap plate 151 to be described later and is electrically connected to the first collector plate 121. The first terminal pillar 122 is exposed to an upper portion of the cap plate 151, and a flange 122a is formed at a lower portion positioned below the cap plate 151 to prevent the first terminal pillar 122 from being dislodged from the cap plate 151. In the first terminal pillar 122, a portion of the pillar positioned below the flange 122a is fitted into the first terminal hole 121a of the first collector plate 121. In one embodiment, the first terminal pillar 122 is electrically insulated from the cap plate 151. The first terminal pillar 122 may have a cylindrical shape, but aspects of the present invention are not limited to the shape of the first terminal pillar 122 disclosed herein.

An upper portion 122c of the first terminal pillar 122 is made of aluminum and a lower portion 122d of the first terminal pillar 122 is made of copper. The upper and lower portions 122c and 122d may be connected to each other by, for example, friction welding. A rivet groove 122b is formed at a location corresponding to the upper portion 122c of the first terminal pillar 122, thereby coupling the first terminal pillar 122 to the cap plate 151 by riveting. In other words, the upper portion 122c of the first terminal pillar 122 is riveted to be fixed to the cap plate 151.

The first terminal nut 123 is coupled to the first terminal pillar 122, and in one embodiment, the first terminal nut 123 and the first terminal pillar 122 are coupled to each other by riveting to fix the first terminal pillar 122 to the cap plate 151. The first terminal nut 123 is made of aluminum, and may have a rectangular shape.

The first terminal pillar 122 and the first terminal nut 123 rivet the upper portion of the first terminal pillar 122, thereby allowing the first electrode terminal 120 to be fixed to cap plate 151.

The second electrode terminal 130 is made of a conductive material such as aluminum and is electrically connected to the second electrode plate 112. The second electrode terminal 130 includes a second collector plate 131, a second terminal pillar 132 and a second terminal nut 133.

The second collector plate 131 contacts the second electrode uncoated portion 112a protruding toward one end of the electrode assembly 110. The second collector plate 131 is formed in an inverted L-shaped ('¬'-shaped) configuration and has a second terminal hole 131a formed at its top portion. The second terminal pillar 132 is fitted into and coupled to the second terminal hole 131a.

The second terminal pillar 132 penetrates the cap plate 151 and protrudes therefrom. In addition, the second terminal pillar 132 is electrically connected to the second collector plate 131 under the cap plate 151. The second terminal pillar 132 may be made of at least one selected from aluminum, an aluminum alloy, and equivalents thereof, but aspects of the present invention are not limited to the materials of the second terminal pillar 132 disclosed herein. Since the second collector terminal 132 has substantially the same configuration as the first terminal pillar 122, except that it is substantially symmetrical with the first terminal pillar 122 about the center of the cap plate 151, a detailed description thereof will be omitted. The second terminal pillar 132 has a flange 132b formed at its lower portion so as not to be dislodged from the cap plate 151. In the second terminal pillar 132, a portion of the pillar positioned below the flange 132b is fitted into the second terminal hole 131a of the second collector plate 131. In one embodiment, the second terminal pillar 132 is electrically connected to the cap plate 151.

A rivet groove 132c is formed at a top end of the second terminal pillar 132, thereby coupling the second terminal pillar 132 to the cap plate 151 by riveting. In other words, after a second terminal nut 133 is coupled to the second terminal pillar 132, the upper portion of the second terminal pillar 132 is rivet to then be fixed to the cap plate 151.

The second terminal nut 133 is coupled to the second terminal pillar 132. The second terminal nut 133 and the second terminal pillar 132 are riveted to each other, thereby fixing the second terminal pillar 132 to the cap plate 151. The second terminal nut 133 is made of aluminum, and may have a rectangular shape.

In addition, since the upper portion of the second terminal pillar 132 is riveted after the second terminal pillar 132 and the second terminal nut 133 are coupled to each other, the second electrode terminal 130 may be fixed to the cap plate 151.

The case 140 is made of aluminum, an aluminum alloy, or a conductive metal such as nickel plated steel, and has a substantially hexahedral shape having an opening through which the electrode assembly 110, the first electrode terminal 120 and the second electrode terminal 130 are inserted and placed. A peripheral portion of the cap assembly 150 substantially corresponds to the opening and the interior surface of the case 140 is insulated so that the case 140 is electrically insulated from the electrode assembly 110, the first electrode terminal 120, the second electrode terminal 130 and the cap assembly 150. In one embodiment, the case 140 may serve as an electrode having a polarity, for example, a positive polarity.

The cap assembly 150 is coupled to the case 140. In detail, the cap assembly 150 includes a cap plate 151, a gasket 152, a plug 153, a vent plate 154, upper insulation members 156 and 156a, a lower insulation member 156b, an inversion plate 157, and a connection plate 158.

The cap plate 151 seals the opening of the case 140, and may be made of the same material as the case 140 and may have the same polarity as the case 140. In addition, the cap plate 151 has a short-circuit hole 151c where the inversion plate 157 to be described later is installed.

The gasket 152 is formed between each of the first terminal pillar 122 and the second terminal pillar 132 and the cap plate 151 using an insulating material, and seals regions between each of the first terminal pillar 122 and the second terminal pillar 132 and the cap plate 151. The gasket 152 may prevent external moisture from permeating into the secondary battery 100 or prevent the electrolyte accommodated in the secondary battery 100 from being effused outside.

The plug 153 seals an electrolyte injection hole 151a of the cap plate 151. The vent plate 154 is installed in a vent hole 151b of the cap plate 151 and has a notch 154a formed to be openable at a preset pressure.

The upper insulation member 156a is formed between the first terminal pillar 122 and the cap plate 151 and is configured such that the first terminal pillar 122 is fitted therein. The upper insulation member 156a closely contacts the cap plate 151 and the gasket 152, and has a hole formed to generally correspond to the short-circuit hole 151c of the cap plate 151. The upper insulation member 156a is formed to encompass the connection plate 158, the upper portion 122c of the first terminal pillar 122, and the first terminal nut 123. The upper insulation member 156a insulates the first terminal pillar 122 from the cap plate 151.

The upper insulation member 156 is formed between the second terminal pillar 132 and the cap plate 151 to allow the second terminal pillar 132 to be fitted thereinto. The upper insulation member 156 insulates the second terminal pillar 132 from the cap plate 151.

The lower insulation member 156b is formed between each of the first collector plate 121 and the second collector plate 131 and the cap plate 151 and prevents an unnecessary short circuit from being generated.

The inversion plate 157 is located between the upper insulation member 156a and the cap plate 151 in the short-circuit hole 151c of the cap plate 151. The inversion plate 157 includes a downwardly convex round portion 157a (i.e., it protrudes toward the electrode assembly 110) and an edge portion 157b fixed to the cap plate 151. The inversion plate 157 is fixed such that the round portion 157a is positioned in the short-circuit hole 151c and the edge portion 157b is positioned between the cap plate 151 and the upper insulation member 156a. The inversion plate 157 may be moved to convexly protrude upwardly (i.e., away from the electrode assembly 110) as the round portion 157a is inverted when overcharge is generated in the secondary battery 100 and the internal pressure reaches a preset pressure. In this configuration, the inversion plate 157 has the same polarity as the cap plate 151.

The connection plate 158 is formed to cover the short-circuit hole 151c of the cap plate 151. The connection plate 158 is electrically connected to the first terminal pillar 122. In addition, the connection plate 158 has a protrusion part 158a formed at a location corresponding to the round portion 157a of the inversion plate 157, wherein the protrusion part 158a protrudes toward the inversion plate 157. In addition, the protrusion part 158a has a diameter smaller than the round portion 157a of the inversion plate 157. The protrusion part 158a is exposed through the insulation layer 160. The connection plate 158 contacts the inversion plate 157 when it convexly protrudes upwardly due to an overcharge being generated in the secondary battery 100 so that the internal pressure of the secondary battery 100 becomes greater than a preset pressure, thereby inducing short-circuits.

The insulation layer 160 may be formed on at least one of top and bottom surfaces (i.e., the surfaces facing away from and toward the electrode assembly 110, respectively) of the connection plate 158. The insulation layer 160 may be made of any one selected from an oxide film, polypropylene (PP), polyethylene (PE), polyvinyl chloride (PVC), urethane, nylon, and Teflon.

When the connection plate 158 is made of aluminum, the oxide film may be formed by anodizing. In addition, in a case where the insulation layer 160 is made of polypropylene (PP), polyethylene (PE), polyvinyl chloride (PVC), urethane, nylon, or TEFLON® (polytetrafluoroethylene), it may be formed by spray coating, deep coating, spin coating, flow coating, or the like.

The insulation layer 160 can prevent the connection plate 158 and the inversion plate 157 from corroding. In other words, even when external moisture is permeated into a portion between the connection plate 158 and the inversion plate 157, the secondary battery 100 according to the illustrated embodiment of the present invention includes the insulation layer 160 formed in the connection plate 158, thereby preventing the connection plate 158 and the inversion plate 157 from being short-circuited and preventing corrosion.

Next, a secondary battery 200 according to another embodiment of the present invention will be described.

Figure 4:
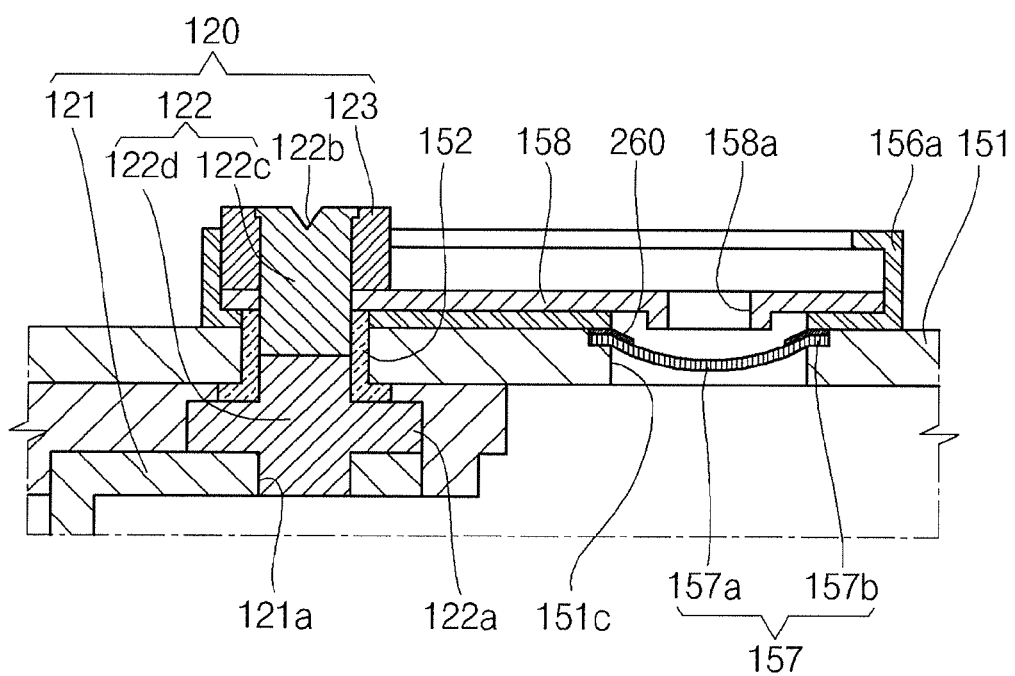
FIG. 4 is a section view of a portion of a secondary battery according to another embodiment of the present invention.

FIG. 4 is a section view of a portion of a secondary battery according to another embodiment of the present invention.

The illustrated secondary battery 200 includes an electrode assembly 110, a first electrode terminal 120, a second electrode terminal 130, a case 140, a cap assembly 150 and an insulation layer 260.

The illustrated secondary battery 200 is substantially the same as the secondary battery 100 according to the previous embodiment shown in FIG. 3 except for the position of the insulation layer 260. Thus, the following description will focus on the insulation layer 260. Since the electrode assembly 110, the first electrode terminal 120, the second electrode terminal 130, the case 140, and the cap assembly 150 of the illustrated secondary battery 200 are formed in the same manner as the corresponding components of the previous embodiment shown in FIGS. 1 to 3, they are denoted by the same reference numerals and a detailed description thereof will not be given.

In the illustrated embodiment, as shown in FIG. 4, the insulation layer 260 may be formed at an edge portion 157b of an inversion plate 157. The insulation layer 260 is formed between an upper insulation member 156a and the edge portion 157b. The insulation layer 260 may be made of any one selected from an oxide film, polypropylene (PP), polyethylene (PE), polyvinyl chloride (PVC), urethane, nylon, and Teflon. The insulation layer 260 may prevent the connection plate 158 and the inversion plate 157 from corroding.

In other words, the secondary battery 200 according to the illustrated embodiment of the present invention includes the insulation layer 260 formed in the edge portion 157a of the inversion plate 157, thereby preventing the connection plate 158 and the inversion plate 157 from being short-circuited and preventing corrosion even when external moisture permeates into a portion between the connection plate 158 and the inversion plate 157.

Next, a secondary battery 300 according to still another embodiment of the present invention will be described.

Figure 5:
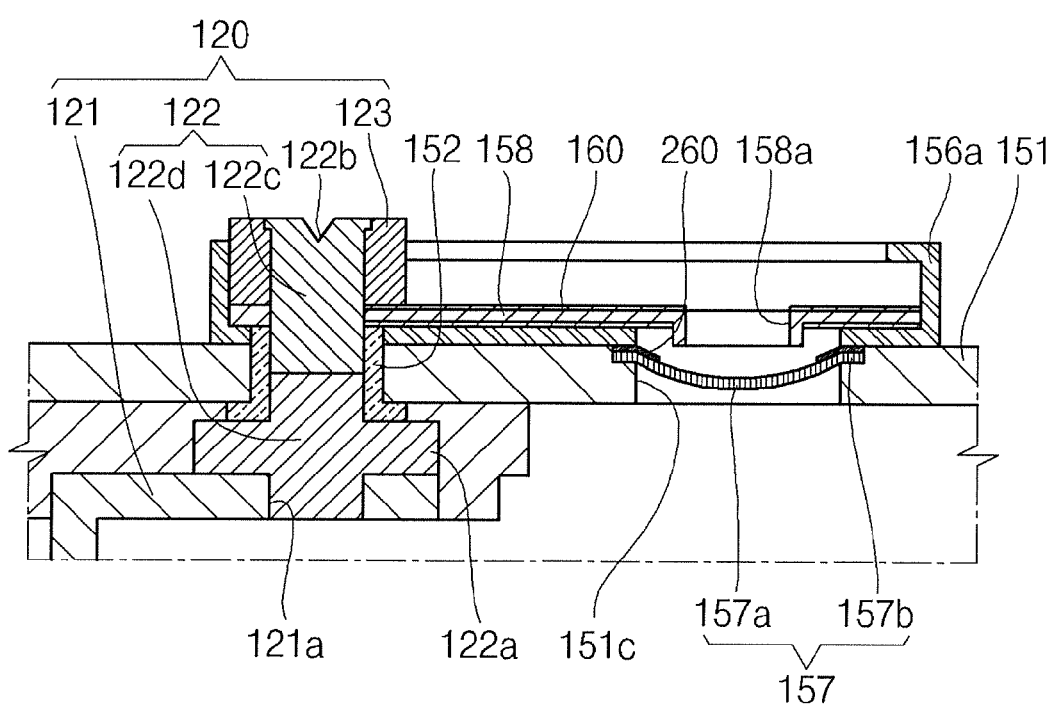
FIG. 5 is a section view of a portion of a secondary battery according to still another embodiment of the present invention.

FIG. 5 is a section view of a portion of a secondary battery according to still another embodiment of the present invention.

The illustrated secondary battery 300 includes an electrode assembly 110, a first electrode terminal 120, a second electrode terminal 130, a case 140, a cap assembly 150 and insulation layers 160 and 260.

The illustrated secondary battery 300 is substantially the same as the secondary battery 100 according to the previous embodiment shown in FIG. 3 except for the positions of the insulation layers 160 and 260. Thus, the following description will focus on the insulation layers 160 and 260. Since the electrode assembly 110, the first electrode terminal 120, the second electrode terminal 130, the case 140, and the cap assembly 150 of the illustrated secondary battery 300 are formed in the same manner as the corresponding components of the previous embodiment shown in FIGS. 1 to 3, they are denoted by the same reference numerals and a detailed description thereof will not be given.

In the illustrated embodiment, as shown in FIG. 5, the insulation layer 160 is formed on at least one of top and bottom surfaces of the connection plate 158. In addition, the insulation layer 260 is also formed at the edge portion 157a of the inversion plate 157. The insulation layers 160 and 260 may be made of any one selected from an oxide film, polypropylene (PP), polyethylene (PE), polyvinyl chloride (PVC), urethane, nylon, and Teflon.

Since the insulation layers 160 and 260 are both formed on the connection plate 158 and the inversion plate 157, they may prevent the connection plate 158 and the inversion plate 157 from corroding.

In other words, the illustrated secondary battery 300 includes the insulation layer 160 formed in the connection plate 158 and the insulation layer 260 formed in the edge portion 157a of the inversion plate 157, thereby preventing the connection plate 158 and the inversion plate 157 from being short-circuited and preventing corrosion even when external moisture permeates into a portion between the connection plate 158 and the inversion plate 157.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A secondary battery comprising:
    an electrode assembly comprising a first electrode plate, a second electrode plate, and a separator located between the first electrode plate and the second electrode plate;
    a case accommodating the electrode assembly; and
    a cap assembly coupled to the case, wherein the cap assembly comprises:
        a cap plate sealing the case and having a short-circuit hole;
        an inversion plate in the short-circuit hole of the cap plate;
        a connection plate covering the short-circuit hole of the cap plate;
        an insulation member between the cap plate and the connection plate; and
        an insulation layer directly attached to the inversion plate or the connection plate.

2. The secondary battery of claim 1, wherein the insulation layer is on at least one surface of the connection plate facing towards or away from the electrode assembly.

3. The secondary battery of claim 1, wherein the inversion plate includes a convex round portion protruding towards the electrode assembly and an edge portion fixed to the cap plate, wherein the round portion is configured to be protrude away from the electrode assembly if the pressure within the secondary battery reaches a preset pressure.

4. The secondary battery of claim 3, wherein the insulation layer is on the edge portion of the inversion plate.

5. The secondary battery of claim 3, wherein the insulation layer is formed on at least one surface of the connection plate facing towards or away from the electrode assembly and on the edge portion of the inversion plate.

6. The secondary battery of claim 1, wherein the insulation layer comprises any one selected from an oxide film, polypropylene (PP), polyethylene (PE), polyvinyl chloride (PVC), urethane, nylon, and polytetrafluoroethylene.

7. The secondary battery of claim 1, wherein the connection plate has a protrusion part that is configured to contact the inversion plate.

8. The secondary battery of claim 7, wherein the protrusion part protrudes toward the inversion plate.

9. The secondary battery of claim 7, wherein the protrusion part has a diameter smaller than a diameter of the inversion plate.

10. The secondary battery of claim 7, wherein the protrusion part is exposed through the insulation layer.

11. The secondary battery of claim 1, further comprising a first electrode terminal penetrating a first side of the cap plate and electrically coupled to the first electrode plate, wherein the first electrode terminal includes a first collector plate electrically coupled to the first electrode plate, and a first terminal pillar electrically connected to the first collector plate and penetrating the cap plate and the connection plate.

12. The secondary battery of claim 11, wherein a first portion of the first terminal pillar comprises copper.

13. The secondary battery of claim 11, wherein a second portion of the first terminal pillar comprises aluminum.

* * * * *